March 29, 1960 A. A. MASTROBATTISTA ET AL 2,930,643
SPLIT RING PACKING
Filed Sept. 18, 1957
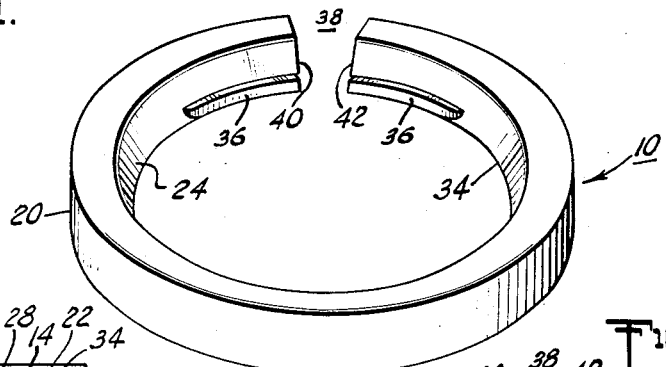
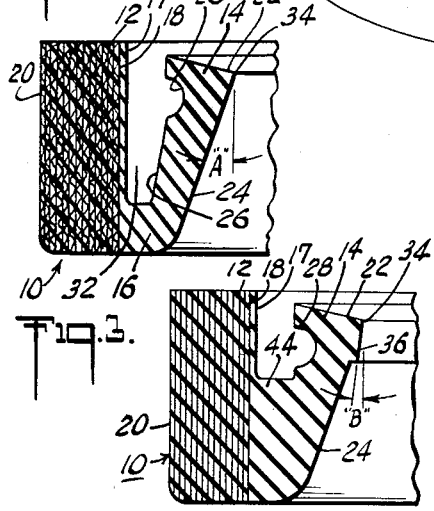
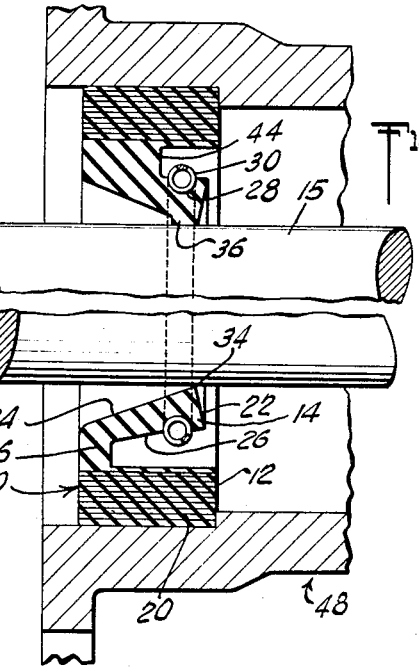
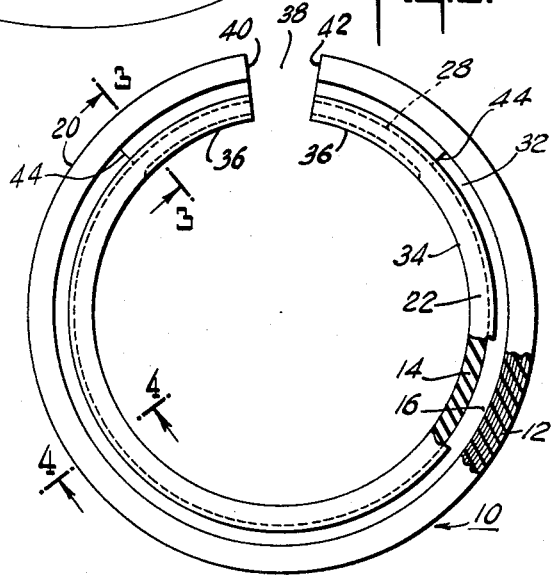
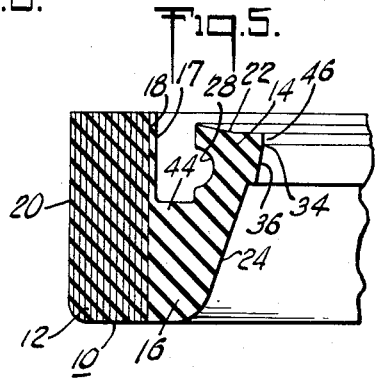
INVENTORS:
ALEX A. MASTROBATTISTA
HOWARD J. BIELING
WALTER B. PETERS
BY
John A. McKinney
ATTORNEY United States Patent Office 2,930,643
Patented Mar. 29, 1960

2,930,643

SPLIT RING PACKING

Alex A. Mastrobattista, Dunellen, Howard J. Bieling, Harrington Park, and Walter Bradford Peters, Maplewood, N.J., assignors to Johns-Manville Corporation, New York, N.Y., a corporation of New York Application September 18, 1957, Serial No. 684,744

6 Claims. (Cl. 288—2)

This invention relates to packings and, more particularly, to an improved ring packing of a split type adapted to provide a fluid or dust-tight seal against a relatively moving part, such as a rotating or reciprocating rod or shaft.

Packings of a split type are employed for making relatively fluid or dust-tight seals between fixed and the movable parts. These split type packings are particularly adapted to be assembled with respect to the relatively moving parts at intermediate portions thereof in situations where it is uneconomical to dismantle the parts, or there is insufficient clearance to permit fitting of solid type packings. Also, split type packings are versatile in that they may be cut down to compensate for variations in dimensions of the associated parts.

Split packings, of the type under consideration, generally are provided in the form of split ring configurations consisting of a relatively rigid heel or body portion together with a relatively flexible, distortable lip or flange portion carried by the former, either interiorly or exteriorly thereof. The lip or flange portion generally is held in sealing engagement with an associated member by means of an annular spring disposed in a suitable groove provided in an appropriate face of the lip or flange portion.

Heretofore, in packings of the above described type, the lip or flange portion generally has been formed with a curvilinear sealing face of substantial width extending along the entire circumferential extent thereof to provide resistance to radial and axial misalignments at the conjoined ends of the packing as during installation and operation. This, also, has been necessary to insure continuous contact and seal between the sealing face and an associated moving part under operative conditions. However, in service, the above described packings have had a disadvantageous tendency to generate excessive heat between the sealing face area of the lip or flange portion thereof and the surface of an associated moving part due to the relatively large area of contact therebetween. The problem of excessive frictional heat is further aggravated in the case of split packings of the aforesaid type by virtue of the fact that greater spring pressures have been normally required to activate the sealing face of the lip or flange portion into effective sealing contact with the associated moving part. This greater spring pressure increases the frictional heat developed between the sealing lip and the moving part during service, thereby accelerating failure of the lip and therefore of the packing. Nor has it been possible, heretofore, to provide such packings with so-called point or line contact type sealing lips for effectively reducing the frictional heat to a minimum, as in the case of solid type packings, for the reason that slight misalignments of the conjoined ends of this type sealing lip would have destroyed the effectiveness of the seal.

Accordingly, a primary object of the present invention is to provide an improved packing of the aforesaid type wherein the sealing lip or flange portion thereof is constructed and arranged in a novel manner as set forth hereinafter whereby the sealing contact area between the packing and an associated moving part will be minimized while at the same time improving the effectiveness and durability of the packing.

Another object of the present invention is to provide an improved packing of the aforesaid type wherein segments may be removed at the split portion thereof to adapt the packing to installations having varying dimensional characteristics without substantially interfering with the effectiveness, durability, or versatility thereof; that is, removal of segments of predetermined sizes to permit relatively greater cut-downs as compared with packings according to the prior art.

Still another object of the present invention is to provide an improved packing of the aforesaid type having a novel lip or flange configuration which in combination with an associated moving part will more effectively seal against the latter and simultaneously require minimum spring pressure as where a circumferential spring is utilized in order to assist in maintaining the seal in operation.

Briefly, a split packing of the character described and constructed in accordance with the instant invention comprises a relatively rigid, annular body or heel section and a relatively pliant, substantially annular composite lip section carried by said body section, the lip section having a circumferential edge forming a sealing lip portion adapted to contact an associated moving part. In particular, according to the present invention, the composite sealing lip portion is formed to include a band of curvilinear, generally axially extended bearing surface continuing for a relatively short arcuate length of an otherwise, and primarily, line contact form of sealing lip edge, the bearing surface following the contour of the sealing lip edge and being of substantial width in relation thereto. The packing will be split at predetermined points along the circumferential extent thereof substantially centrally of the extended bearing surface area. This construction will provide against distortion of the lip section at the split portion thereof and will admit of lateral or generally axial misalignments of the contacting lip areas thereat without destroying the sealing effectiveness of the packing throughout the curvilinear length of its sealing lip when applied in relation to an associated moving part. Therefore, the sealing lip edge of a split packing constructed according to the present invention will make a point or line contact about the major part of the circumference of an associated moving part and still provide an effective and durable seal for the reasons set forth above and as described with more particularly hereinafter.

Further objects and advantages of the present invention will be apparent in view of the specification set forth hereinafter.

In the drawing, wherein like numerals designate like parts:

Fig. 1 is a perspective view of a particular embodiment of the present invention;

Fig. 2 is a plan view of the underside of the embodiment of the invention illustrated in Fig. 1;

Fig. 3 is a fragmentary cross-sectional view taken generally along the line 3—3 of Fig. 2;

Fig. 4 is a fragmentary cross-sectional view taken generally along the line 4—4 of Fig. 2;

Fig. 5 is a fragmentary cross-sectional view generally similar to that appearing in Fig. 3 but showing a slight modification; and Fig. 6 is a fragmentary cross-sectional view taken through a stuffing box arrangement fitted with the embodiment of the present invention illustrated in the various other views of the drawing.

Referring now more particularly to the drawing, the embodiment of the present invention illustrated therein generally comprises a split ring or annular member 10 of substantially U-shaped cross-sectional configuration consisting of a supporting heel portion 12 and a sealing lip or flange portion 14 carried by and extending angularly from the heel 12, as shown in Figs. 1, 2, 3, 4 and 5.

In accordance with conventional practice, as for example disclosed in Patent No. 2,372,095 to George P. Leistensnider et al., issued March 20, 1945, the heel portion 12 of the packing is constructed to provide a relatively rigid supporting annulus designed to resist deformation while being adapted for molding into a unitary packing configuration having the associated lip or flange portion 14. As disclosed in the aforesaid patent, the heel 12 may be formed of a plurality of layers of resin-impregnated fabric, such as cotton duck, asbestos fabric, or the like, the composite being coated with a suitable rubber composition, such as synthetic chloroprene rubber. The lip or flange portion 14 generally will be formed of a plastic suitably soft, resilient, and abrasion resistant composition such as the synthetic chloroprene rubber used for coating the heel portion 12. Thus, the lip or flange portion 14 may be integrally bonded to the heel portion 12 as during the packing molding operation to provide a relatively flexible, yieldable and distortable material in contact with an associated moving part 15 (Fig. 6), or the like, for effective sealing. A neck section 16 (Figs. 4 and 5) which may be considered as a part of the lip or flange portion 14 is preferably of the same characteristics with respect to deformability and yieldability as the latter. It will be appreciated, however, that the instant invention is not limited to a packing ring of any particular composition.

More specifically, the heel portion 12 of the particular embodiment of the invention shown in the drawing is of substantially rectangular cross-section having a pair of spaced circumferential side wall faces or surfaces 18 and 20 (Figs. 1, 2, 3, 4 and 5). The lip portion 14, which is joined to the supporting heel portion 12 through the medium of the integral circumferential neck portion 16 together with the bonding wall portion 17, is formed in a generally hollow substantially frusto-conical outline as indicated by the cross-sectional appearance thereof shown in Figs. 3, 4 and 5.

Thus, as shown in Figs. 3 and 4, the lip or flange portion 14 is generally defined by a forward or upper surface 22 extending generally radially in a sealing direction but somewhat rearwardly or downwardly inclined; a frustro-conical surface 24 on the inner or sealing side being inclined or tapered in relation to the axis of the packing at an angle "A" (Fig. 4) of approximately 25°; and an outer surface 26 being circumferentially indented by a groove 28 to accommodate an annular coil garter spring 30 (Fig. 6) for the purpose of applying the required radially constrictive pressure for maintaining the lip or flange portion 14 of the packing in effective sealing engagement with the associated moving part 15 (Fig. 6). Accordingly, the packing 10 generally is comprised of the split supporting heel portion 12 being in radially spaced relation to its split integrally formed yieldable flange portion 14 so that, together with the split connecting neck portion 16 of the latter, there is defined an interrupted annular channel 32 (Fig. 4) therebetween.

The surfaces 22 and 24 of the lip or flange portion 14 terminate in an innermost yielding extremity or edge means 34 forming a feathered line contact sealing lip portion adapted to bear against the peripheral surface of an associated moving part 15 as shown in Fig. 6. The edge or sealing lip means 34 extends substantially throughout the major portion of the interrupted marginal circumference of the lip or flange portion 14, as shown in Figs. 1 and 2.

It is a particular feature of the present invention, as mentioned hereinabove, to provide an integral extended bearing surface 36 of substantial width adjacent the ends 40 and 42 of the packing at the split portion 38 thereof (Figs. 1, 2, 3, 5 and 6). The bearing surface 36 will be of curvilinear form and coextensive with the lip edge 34 for an arcuate portion thereof for reasons stated more fully hereinafter. In the preferred embodiment of the invention illustrated, the bearing surface 36 will extend rearwardly or downwardly from the lip edge 34 at an inclination "B" (Fig. 3) of approximately 3° to 10° with respect to the axial centerline of the packing as compared with the previously set forth inclination of approximately 25° for the adjacent surface area 24. It will be appreciated that the specific inclination of the surface 24 and the bearing or contact area 36 within the range indicated above will be controlled in large measure by the physical characteristics of the material used to form the lip or flange portion 14 and, also, by the size and position of the flange areas in relation to the supporting heel part 12 together with the degree of spring tension desired for maintaining an effective seal in operation.

Furthermore, it is desirable, for example, that split packings be adapted to be cut down by the removal of segments of predetermined size, depending upon the actual dimensions of the stuffing box arrangement, or the like, for fitting in situations where there may be variations in the size of the associated parts. Of course, when fairly large segments of the packing are removed at the split portion thereof, the unequal stresses created in the process of constricting the annulus into closed form of reduced size will affect the stability of the sealing lip or flange, especially in the area of the conjoined ends thereof.

Accordingly, it is a further feature of the present invention to form the portions of the annular channel 32 adjacent the ends 40—42 of the split packing with an integral reinforcing web portion 44 which is continued to be substantially coextensive with the arcuate extent of the lip bearing surface 36 and to beneath the annular spring means groove 28 provided in the flange surface 26 (Figs. 2, 3 and 6). In this manner, the web portion 44 is of a bulbous cross-sectional character and will reinforce the lip or flange portion 14 adjacent to the split ends 40—42 thereof and, thereby, reduce the tendency of the bearing edge and surface portions 34 and 36, respectively, to become misaligned under the stresses created when the packing is utilized in maximum cut down condition (Figs. 2, 3 and 6).

Therefore, it will be appreciated to be a particular advantage of the present invention that a split packing constructed and arranged in the aforesaid manner will provide a line contact sealing edge 34 throughout its circumferential extent. At the same time, due to the presence of the sealing surface arrangement 36 adjacent the split ends 40—42, the seal at the conjoined ends of the packing will remain effective even under conditions of distortion or lateral misalignment of the sealing flip or flange portions thereat, since reliance is not placed on the exact mating of the ends to provide a circumferentially continuous sealing surface or edge, as would be the case if the line contact edge 34 were continued to the split ends 40—42. It further will be appreciated to be another advantage of the present invention that the particular lip or flange configuration in the area of the ends 40—42 (Figs. 1 and 2) of the split packing, including the lip reinforcing web means 44—44 thereat, will serve to permit maintenance of the above ends in conjoined relation with minimum spring tensions even under maximum cut down conditions. Thus, the split packing of the present invention is arranged to provide minimum contact area in performing its sealing function so as to reduce objectionable frictional heat to a minimum, and yet will effectively seal at the conjoined ends of the packing even in the presence of the unequal internal stresses created by cutting segments off the ends 40—42 of the packing to adapt the seal for a relatively wide range of dimensional variations.

A slightly modified form of the split packing is shown in Fig. 5 wherein the circumferential edge 34 is axially extended forwardly or upward by enlarging the lip or flange portion 14 as indicated at 46 to provide a circumferential sealing surface in the range of from 0.010 to 0.030 inch in width. This axially extended contacting surface 46 will further insure a continuous sealing contact area at the circumferential juncture of the line sealing edge 34 and the extended sealing surface 36 in the vicinity of the split ends 40—42 even under conditions of otherwise excessive flash removal during the usual trimming operation after completion of the molding of the packing. The contacting surface 46 in this modified form of the invention will also serve as a convenient visual guide during the trimming operation to minimize excessive flash removal in critical areas of the sealing lip or flange.

Fig. 6 illustrates the split packing ring 10 in assembled position within a journal box arrangement 48, the packing lip or flange portion 14 being constricted by means of the spring 30 into sealing contact with the shaft 15. As shown in Fig. 6, the circumferential sealing edge 34 is in point or line contact with the periphery of the shaft 15, and the sealing surface 36 as provided at the split ends of the seal makes a wider surface contact thereon. Therefore, it is believed to be apparent from the view of Fig. 6 that misalignment of the abutting ends 40—42 (not shown) would not interrupt the circumferential seal around the shaft 15.

The sealing ring illustrated in the drawing is of the inside lip type, but it will be recognized that the invention is equally effective when embodied in an outside lip seal (not shown). It will also be recognized that the invention is not limited to the specific form of seal disclosed but it is equally applicable to split rings of other types and configurations which involve a supporting heel and a flexible lip.

Accordingly, while specific embodiments of the present invention have been set forth and described in detail herein, it will be understood that the invention is not so limited but that various changes and modifications may be made therein without departing from the spirit of the invention or the scope of the appended claims.

What we claim is:

1. A packing comprising a relatively rigid, annular body section and a relatively pliant, annular lip section carried concentrically by said body section, said lip section having surfaces terminating in an innermost edge forming a sealing lip adapted to contact a moving part, said lip section having a relatively short, arcuate band having a bearing surface extending axially from said edge and adapted to maintain effective seal in the event of radial and axial misalignment of the free ends of said lip and body sections when transversely split through said arcuate band.

2. A generally radially split packing of discontinuous generally annular configuration including a supporting heel portion, and a composite flange portion, said composite flange portion having a plurality of angularly disposed surfaces arranged to converge throughout its arcuate length in a direction away from said supporting heel portion to form a composite sealing edge, one of said angularly disposed surfaces extending from said sealing edge for only a limited portion of its arcuate length from and adjacent the ends thereof defined by the split in such substantial alignment with the axial center line of said packing as not to be directed at an angle of more than about 10° relative thereto, thereby providing surface contact sealing lip areas at and adjacent the ends thereof, to insure continuity of at least line contact, circumferentially, of the sealing edge, across the split, when the packing is constricted for abutment of its ends to effect a continuous seal, and the remaining portion of the arcuate length of said sealing edge being formed to provide a line contact sealing lip.

3. A generally radially split packing of generally annular configuration susceptible of deformation in connection with mounting and use being formed of a supporting annular heel portion, and a composite annular flange portion joined to and spaced throughout at least most of its arcuate length from the former by a connecting neck portion, said flange portion being resiliently movable with respect to said heel portion, said flange portion having a pair of angularly related surfaces converging throughout the circumferential extent thereof in a direction away from said heel portion into a sealing edge, one of said surfaces being interrupted in the vicinity of the ends thereof by enlargements of said flange portion forming supplementary surface bearing areas of only limited arcuate extent extending angularly from said sealing edge substantially in parallelism with the axial center of said packing, so as not to form an angle of greater than about 10° therewith, whereby abutment of said ends as by constriction of said packing in use will provide a circumferential sealing edge effective as at least a continuous line contact sealing lip across said split even under conditons of lateral misalignments of its abutting ends, the remainder of the arcuate length of said sealing edge being formed by said converging surfaces to provide a line contact sealing lip.

4. A split packing of the character described in claim 3, said flange portion being reinforced in relation to the packing in only the immediate area adjacent its ends by a built-up portion, of limited arcuate extent, and of an axial extent insufficient to provide a solid cross-sectional configuration radially opposite said sealing edge.

5. A split packing as defined in claim 4, including spring means radially opposite said sealing edge and urging the sealing edge in a sealing direction, away from the supporting heel portion.

6. A packing of generally substantially annular configuration having a sealing flange portion of relatively flexible material and being generally radially split to form ends adapted to be brought into abutment in installed sealing position, said flange portion being formed to provide a composite, substantially continuous circumferentially extending sealing edge, interrupted by said split, said edge comprising a band of such axial width as to provide a substantial area contact sealing lip surface, said band extending over only a limited portion of its arcuate length at and from each end of the packing, said band being in such substantial parallelism with the axial central line of the packing as not to be directed at an angle of more than about 10° with respect thereto and providing for substantial continuity of at least line contact in said sealing edge, circumferentially, across said split, when said ends are abutted together, said edge further comprising, over the remainder of its arcuate extent, a feathered, line contact sealing lip portion.

References Cited in the file of this patent

UNITED STATES PATENTS

| | | |
|---|---|---|
| 2,523,604 | Vedovell | Sept. 26, 1950 |
| 2,719,743 | Brummer et al. | Oct. 4, 1955 |
| 2,729,481 | Chambers et al. | Jan. 3, 1956 |